Oct. 14, 1930.  W. H. BAHLKE  1,778,445
DISTILLATION OF HYDROCARBON OILS
Filed Aug. 9, 1928
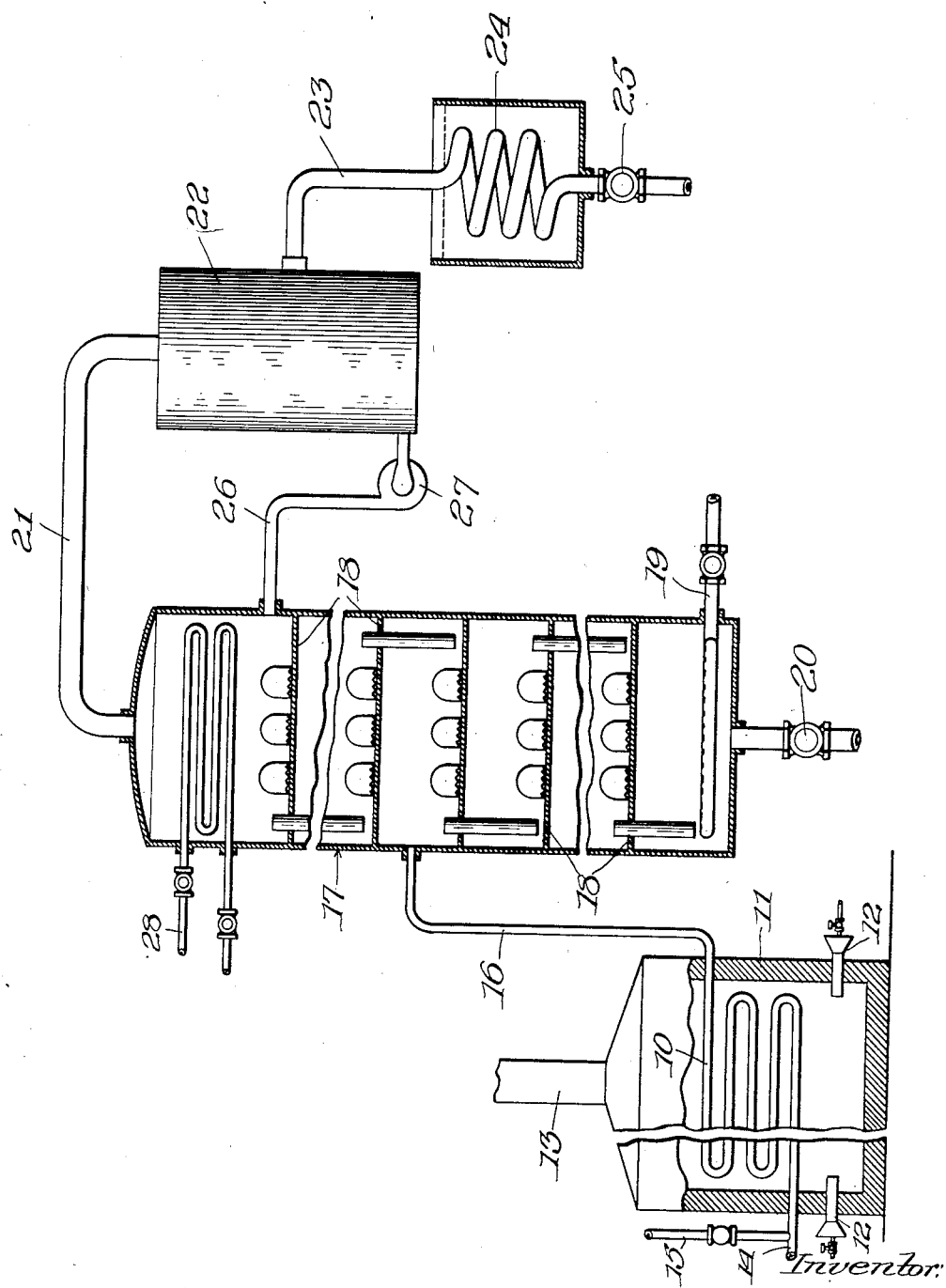
Inventor:
William H. Bahlke,
By Dyrenforth, Lee, Chritton & Wiles,
Attys.

Patented Oct. 14, 1930

1,778,445

UNITED STATES PATENT OFFICE

WILLIAM H. BAHLKE, OF WHITING, INDIANA, ASSIGNOR TO STANDARD OIL COMPANY, OF WHITING, INDIANA, A CORPORATION OF INDIANA

DISTILLATION OF HYDROCARBON OILS

Application filed August 9, 1928. Serial No. 298,562.

This invention relates to distillation of hydrocarbon oils and will be readily understood from the following description in conjunction with the accompanying drawing which illustrates diagrammatically and partly in section a suitable apparatus for effecting such distillation.

Referring to the drawing, 10 is a heating coil located in a suitable setting 11, provided with suitable heating means 12 and a flue 13 for combustion gases. The inlet 14 of the coil 10 is provided with a valved pipe 15 whereby a regulated amount of steam may be admitted with the oil into said coil. The outlet 16 of the coil 10 leads into an intermediate point of a fractionating column 17, which is provided above and below the point of entry of the pipe 16 with suitable fractionating devices, for example, bubble cap plates 18. A perforated steam coil 19 enters into the lower end of the column 17.

At its lower end the column 17 is provided with an outlet 20 for withdrawal of the stripped heavy oil. From its upper end a vapor outlet 21 leads to a partial condenser 22 of any suitable type. The vapor outlet 23 of the partial condenser 22 leads into a water condenser 24 which is provided with a liquid outlet pipe 25. A reflux return line 26 leads from the partial condenser 22 into the upper end of the column 17. A pump 27 is provided in the line 26. If desired, a cooling coil 28 adapted to be supplied by any suitable cooling medium may be located in the top of the column 17, so that the necessary reflux may be formed within the column.

In operation the oil to be treated is supplied to the coil 10 and is heated at least to such a temperature that it is completely vaporized therein. Preferably, the vapors are superheated in the coil 10 to a predetermined extent and are admitted in superheated condition into the column 17 by the pipe 16. In the case of oils containing heavy fractions, steam may be supplied by pipe 15 in such quantity that the oil becomes vaporized and superheated in the coil 10 to temperatures at which no substantial amount of cracking or impairment of lubricating qualities, for example, takes place.

The vapors described through the bubble cap plates 18 above the point of entry of the pipe 16, in countercurrent to descending reflux supplied by pipe 26 or condensed by the cooling coil 28. Owing to the superheat of the entering vapors the amount of reflux required for their fractionation is considerably greater than that which would be necessary if the vapors were introduced into the column 17 in saturated condition. Accordingly the reflux ratio can be made sufficiently large to insure efficient fractionation and the condensation of a sharp cut which may constitute a relatively small part of the oil treated.

Such condensate passes downwardly through the stripping plates of the column 17 below the point of entry of the pipe 16 and are therein freed from light ends by stripping steam supplied by pipe 19. The stripped condensate is removed from the column 17 by pipe 20.

The remainder of the oil passes from the top of the column 17 in the form of vapors which are suitably processed for the recovery of other valuable products therefrom. A part of such vapors may be condensed in the condenser 22 and the condensate returned to the column by pipe 26 for use as reflux therein. The remainder of the vapors pass by pipe 23 to the condenser 24 where it is condensed. It will be obvious that instead of condensing the vapors from the tower 17 in this manner, they may be passed to other suitable apparatus (not shown) where they may be further treated in any suitable manner, for example, they may be fractionally condensed to recover lighter fractions.

It is found that by completely vaporizing the oil in the coil 10 a minute amount of nonvolatile matter is deposited therein. Consequently the oils thus distilled are of superior color. Another factor which contributes to the superiority of the color of the heavy fraction is that such fraction is a sharper cut and is larger in volume than the oil of similar viscosity obtained in similar manner without superheating the vapors, so that the coloring matter is more dilute. It may be stated that in operating in this manner it is possible to obtain substantial cuts of heavier ends which could not possibly be separated by operating in the same manner without superheating the vapors.

The amount of superheat to which the vapors are subjected may vary under wide limits in accordance with the product which is desired and with the amount of such product that is present in the oil distilled. The effects indicated above are manifest to some extent for any degree of superheat that may be employed. In general, the degree of superheat is such that the amount of reflux necessitated establishes a reflux ratio sufficiently great that effective fractionation results.

The invention will be more perfectly understood from the following specific example.

Pressed distillate, completely vaporizable at 750° F., of cold test 25° F. and viscosity 62 sec. Saybolt (at 100° F.) and containing about 20 to 25% of oil of viscosity of 375 sec. Saybolt (at 100° F.) when reduced to a bottom by straight reduction, is passed through the coil 10, vaporized and the vapors superheated to a temperature of about 830 to 840° F. therein. If desired, 1 lb. of steam per gallon of feed may be supplied by pipe 15. With this amount of steam the oil is completely vaporized at a temperature of 680° F. and may suitably be superheated in the coil 10 to about 750 to 760° F.

The vapors pass upwardly through the column 17 in the manner indicated above. Reflux is supplied by pipe 26 or is condensed in the column by the cooling coil 28, and steam is supplied by pipe 19 in controlled quantities so as to supply by pipe 20 an oil of the desired characteristics, for example, a lubricating oil of viscosity of 375 sec. Saybolt (at 100° F.) amounting to about 20 to 25% of the feed. For this product, between 0.3 and 0.5 lbs. of steam per gallon of the lubricating oil passing out of pipe 20, may be supplied by the pipe 19. The color of this oil is about 2 R and is substantially better than that of the corresponding residue derived by a straight reduction. It may be stated that it is believed to be impossible to derive an appreciable yield of oil of this viscosity from the same feed by operating in the same manner but without superheating the vapors.

Not only have oils produced by the present process better color, but they also possess a lower Conradson carbon content.

While the invention has been described primarily in its application for the recovery of a small fraction of heavier oil, it must be understood that it is also applicable for the removal of a small proportion of heavier oil in order to obtain the main body of the oil with desired characteristics. For example, this method is highly suitable for the purpose of removing relatively small quantities of kerosene constituents from gasoline to yield a more volatile gasoline.

While the invention has been described in connection with details of a specific embodiment thereof, it must be understood that such details are not intended to be limitative upon the scope of the invention except in so far as set forth in the accompanying claims.

I claim:

1. The method of distilling substantially completely vaporizable hydrocarbon oil having a viscous oil as its heaviest fraction which comprises heating such oil to effect its substantially complete vaporization while preventing appreciable decomposition thereof, passing the resulting vapors to a fractionating column, fractionating them therein to condense the heavier viscous fraction, and withdrawing such condensate from said column.

2. The method of distilling substantially completely vaporizable hydrocarbon oil having a viscous oil as its heaviest fraction which comprises heating such oil with steam to completely vaporize the oil while preventing appreciable decomposition thereof, passing said mixture to a fractionating column, fractionating it therein to condense the heavier viscous oil fraction, and withdrawing such condensate from said column.

3. The method of distilling substantially completely vaporizable hydrocarbon oil having a viscous oil as its heaviest fraction which comprises heating such oil to effect complete vaporization thereof and superheat the vapors while preventing appreciable decomposition thereof, passing the resulting vapors to a fractionating column, fractionating them therein to condense the heavier viscous oil fractions and withdrawing such condensate from said column.

4. The method of distilling substantially completely vaporizable hydrocarbon oil having a viscous oil as its heaviest fraction which comprises heating such oil with steam to effect substantially complete vaporization of the oil and to superheat the oil vapor-steam mixture while preventing appreciable decomposition thereof, passing the resulting vapors to a fractionating column, fractionating them therein to condense the heavier viscous oil fractions and withdrawing such condensate from said column.

5. The method of distilling substantially completely vaporizable hydrocarbon oil having a viscous oil as its heaviest fraction which comprises heating such oil to effect its complete vaporization and to superheat the resulting vapors while preventing appreciable decomposition thereof, passing the resulting vapors to a fractionating column, supplying within said column sufficient reflux to condense from the superheated vapors and to fractionate the heavier viscous oil fractions, and removing such condensate from the column.

6. The method of distilling substantially completely vaporizable hydrocarbon oils having a viscous oil as its heaviest fraction which comprises heating such oil together with steam to effect complete vaporization of the oil and to superheat the resulting vapors and steam while preventing appreciable decomposition of the oil, passing the resulting vapors to a fractionating column, supplying in said column sufficient reflux to condense from the superheated mixture of oil vapors and steam and to fractionate the desired viscous heavy oil fractions, and withdrawing such condensate from the column.

7. The method of distilling substantially completely vaporizable hydrocarbon oil having a viscous oil as its heaviest fraction which comprises passing such oil continuously in a confined stream through a heating zone wherein it is heated to effect its substantially complete vaporization while preventing appreciable decomposition thereof, supplying the vapors to a fractionating column, and cooling them therein to condense the heavy viscous oil fraction.

8. The method of distilling substantially completely vaporizable hydrocarbon oil having a viscous oil as its heaviest fraction which comprises passing the oil continuously in a confined stream through a heating zone and heating the oil to effect its complete vaporization and to superheat the vapors while preventing appreciable decomposition thereof, passing the resulting superheated vapors to a fractionating column, supplying reflux therein to fractionate the vapors and condense therefrom the heavier viscous oil fraction.

9. The method of distilling substantially completely vaporizable hydrocarbon oil having a viscous oil as its heaviest fraction which comprises passing such oil together with steam in a confined stream through a heating zone, heating the mixture therein to completely vaporize the oil while preventing appreciable decomposition thereof, passing the resulting vapor mixture into a fractionating column and cooling it therein to condense the heavier viscous fractions.

10. The method of distilling substantially completely vaporizable hydrocarbon oil having a viscous oil as it heaviest fraction which consists in passing such oil continuously in a confined stream through a heating zone, heating it to completely vaporize the oil and superheat the resulting vapors while preventing appreciable decomposition thereof, passing the superheated vapors to a fractionating column, and cooling the vapors therein to condense the heavier lubricant fraction.

11. The method of distilling substantially completely vaporizable hydrocarbon oil having a viscous oil as its heaviest fraction which comprises passing such oil together with steam in a confined stream through a heating zone and heating it therein to completely vaporize the oil and to superheat the vapors while preventing appreciable decomposition of the oil, passing the superheated vapor mixture into a fractionating column and cooling it therein to condense the heavy viscous fractions of the oil.

12. The method of distilling a substantially completely vaporizable hydrocarbon oil having a viscous oil as its heaviest fraction which comprises passing such oil in a confined stream through a heating zone and heating it therein to completely vaporize the oil and to superheat the vapors while preventing appreciable decomposition thereof, passing the resulting vapors to a fractionating column, and supplying cooling reflux therein, whereby the superheated vapors are fractionally cooled and the heavy viscous fractions of the oil condensed therefrom, the superheating of the vapors and the reflux supplied in said column being controlled to secure a closely fractionated cut of the desired heavy viscous fractions.

13. The method of distilling substantially completely vaporizable hydrocarbon oil containing a relatively small proportion of a desired lubricant oil as its heaviest fraction which comprises passing such oil in a confined stream through a heating zone together with steam, heating the oil and steam in said stream to completely vaporize the oil and superheat the resulting vapor mixture, passing the superheated vapor mixture to a fractionating column, supplying reflux in said column to fractionally condense from the vapors the desired heavy lubricant fraction, the superheating of the oil vapor mixture and the supply of reflux in the column being controlled to effect close fractionation of the heavy lubricant cut thus produced.

In testimony whereof I have hereunto set my hand this seventeenth day of July, 1928.

WILLIAM H. BAHLKE.